United States Patent
Brussow et al.

(10) Patent No.: US 12,182,217 B1
(45) Date of Patent: Dec. 31, 2024

(54) MACHINE LEARNING SYSTEM AND METHOD FOR TOTAL ADDRESSABLE MARKET ASSESSMENTS IN CONNECTION WITH KEYWORD QUALIFICATION

(71) Applicant: Terakeet LLC, Syracuse, NY (US)

(72) Inventors: Jennifer Brussow, Syracuse, NY (US); Patrick Danial, Syracuse, NY (US); Craig Waterman, Syracuse, NY (US)

(73) Assignee: Terakeet LLC, Syracuse, NY (US)

( * ) Notice: Subject to any disclaimer, the term of this patent is extended or adjusted under 35 U.S.C. 154(b) by 0 days.

(21) Appl. No.: 18/654,419

(22) Filed: May 3, 2024

(51) Int. Cl.
*G06F 16/9538* (2019.01)
*G06F 16/951* (2019.01)
*G06F 40/30* (2020.01)

(52) U.S. Cl.
CPC ........ *G06F 16/9538* (2019.01); *G06F 16/951* (2019.01); *G06F 40/30* (2020.01)

(58) Field of Classification Search
CPC ..... G06F 16/9538; G06F 16/951; G06F 40/30
See application file for complete search history.

(56) References Cited

U.S. PATENT DOCUMENTS

| | | | |
|---|---|---|---|
| 2007/0226640 A1* | 9/2007 | Holbrook | G06F 16/951 715/765 |
| 2012/0005207 A1* | 1/2012 | Gulhane | G06F 16/9535 707/E17.014 |
| 2015/0227524 A1* | 8/2015 | Gouyet | G06F 16/957 707/707 |
| 2016/0224662 A1* | 8/2016 | King | G06N 20/00 |
| 2021/0374164 A1* | 12/2021 | Ghoula | G06F 16/285 |
| 2022/0207030 A1* | 6/2022 | Chowdhury | G06N 20/00 |
| 2023/0334070 A1* | 10/2023 | Gullapudi | G06F 40/284 |
| 2023/0360388 A1* | 11/2023 | Singh | G06V 30/10 |

* cited by examiner

*Primary Examiner* — Cam Y T Truong
(74) *Attorney, Agent, or Firm* — Charles B. Lobsenz; Brian H. Buck; Potomac Law Group, PLLC

(57) ABSTRACT

Provided are a method and system for selecting and ranking keywords, including a process through which a universe of potential keywords tied to various topics is generated and filtered. Once this is completed, search engine ranking pages (SERPs) are generated for these potential keywords. Reference text associated with topics of interest is also generated by the system of the present invention. This can be accomplished in various ways according to the teachings herein. For example, reference text can be generated using generative AI functionality. Initial reference text can be later improved upon using machine learning techniques so as to adjust reference text that is too broad or narrow in scope. Reference text and SERP results are used in connection with a model to generate semantic similarity scores which are then used for ranking and selecting keywords.

12 Claims, 4 Drawing Sheets

MACHINE LEARNING SYSTEM AND METHOD FOR TOTAL ADDRESSABLE MARKET ASSESSMENTS IN CONNECTION WITH KEYWORD QUALIFICATION

FIELD OF THE DISCLOSURE

Disclosed embodiments relate to identifying and qualifying keywords in connection with search engine optimization, and more specifically, to the leveraging of total addressable market analysis in connection with search engine optimization to assess keyword significance.

BACKGROUND

It is well known that success in connection with web based properties is directly tied to the amount of traffic that the web properties generate. Traffic directly impacts the level of success regardless of the goal(s) associated with the web properties. Whether the goal is to build a brand, create product or service awareness, promote events, convert sales of products or services, drive traffic to other web properties etc., it is almost always the case that more traffic to the website and more interaction with the website and its associated web pages is highly desirable.

There are various ways to drive traffic to web properties. One of the most effective ways is by optimizing websites through the use of keywords within the website that result in search engine algorithms ranking one or more pages within the website with a high ranking. . . . This typically means within the first one or two pages of search engine results with respect to keywords that drive the most desirable/qualified users to the web properties.

In addition and as opposed to the foregoing "organic" search engine rankings, paid search can be also be used to drive traffic to web properties. In this case, it is important to optimize spend by selecting keywords and topics that will drive the most relevant/qualified users to the web property at the lowest possible cost.

In either case, keyword selection is critical to driving the most relevant and qualified users to the web properties since it is these users that are most likely to enable the website property operator to achieve its goals. However, with the advent of social media, the virtual explosion of content available on the web and the ever increasing sophistication of search engine algorithms and related optimization techniques, it can be quite difficult to select the most desirable key words from a huge universe of possibilities.

Difficulty in selecting and/or ranking of keywords relevant to topics of interest to and/or related to a web property arises due to many factors. For example, the required research and analysis can be extremely time consuming, prone to error, expensive and typically requires manual involvement by one or more individuals. This is due in large part to the expansive set of topics and content that can be involved in keyword assessment and analysis. In some cases, the universe of potential keywords potentially applicable to a desired topic can be extremely large. When this happens it can be difficult, if not impossible, to assess, rank and/or select the keywords that will result in the best rankings for the relevant topics.

Also, it has proven difficult to rank keywords in respect of desired topics to achieve the maximum effect of driving the most desirable traffic to web properties and specific web pages associated therewith. In particular, existing solutions for keyword ranking and selection suffer from less than ideal results due to such issues as keyword competition, algorithm updates, slow page speeds, and other issues.

Another drawback of existing solutions is that keyword selection and ranking is often times inconsistent and/or not easily replicable. Thus, teachings and learnings with respect to the selection and ranking of keywords as they relate to desirable topics are often not considered in future analysis leaving the same mistakes to be repeated time and time again. This can result in keyword selection that is less than desirable both in terms of ROI and effectiveness in driving the desired traffic to the web properties.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system regarding selecting and ranking keywords using a Total Addressable Market ("TAM") analysis, including a process through which a universe of potential keywords tied to various topics is generated and filtered. Once this is completed, search engine results pages (SERPs) are generated for these potential keywords. Reference text associated with topics of interest is generated by the system of the present invention. This can be accomplished in various ways according to the teachings herein. For example, reference text can be generated using generative AI functionality. Initial reference text can be later improved upon using machine learning techniques so as to adjust reference text that is too broad or narrow in scope.

The textual data in the generated SERPS is then compared with reference text tied to desirable topics in order to generate a semantic similarity score (SSS) for each applicable keyword-topic pair. This SSS can then be used to rank keywords with respect to each topic of interest as such topics are reflected by the aforementioned reference text. In addition, and in some embodiments, the TAM associated with each keyword can be obtained and can also guide decision making in connection with keyword selection.

Additional embodiments may include methodologies and systems wherein various metrics useful in guiding keyword selection in connection with SEO can be generated. This may include, for example, keyword MSV (monthly search volume) of qualifying keywords as well as a total MSV of all qualifying keywords aligned with a topic representing the TAM associated with a specific topic.

In some other embodiments, the system and methodologies of the present invention may use the highest SSS's to assign group membership to ranking keywords. In this way, assessments can be made by the system as to whether there may be issues with topic definition and in turn, revise topic definition to ensure that topic textual content is neither too broad nor to narrow. As such, the system and methodologies of the present invention can apply machine learning techniques as well as natural language processing to enhance keyword ranking and selection over time as results continue to be generated.

DETAILED DESCRIPTION

Figure 1:
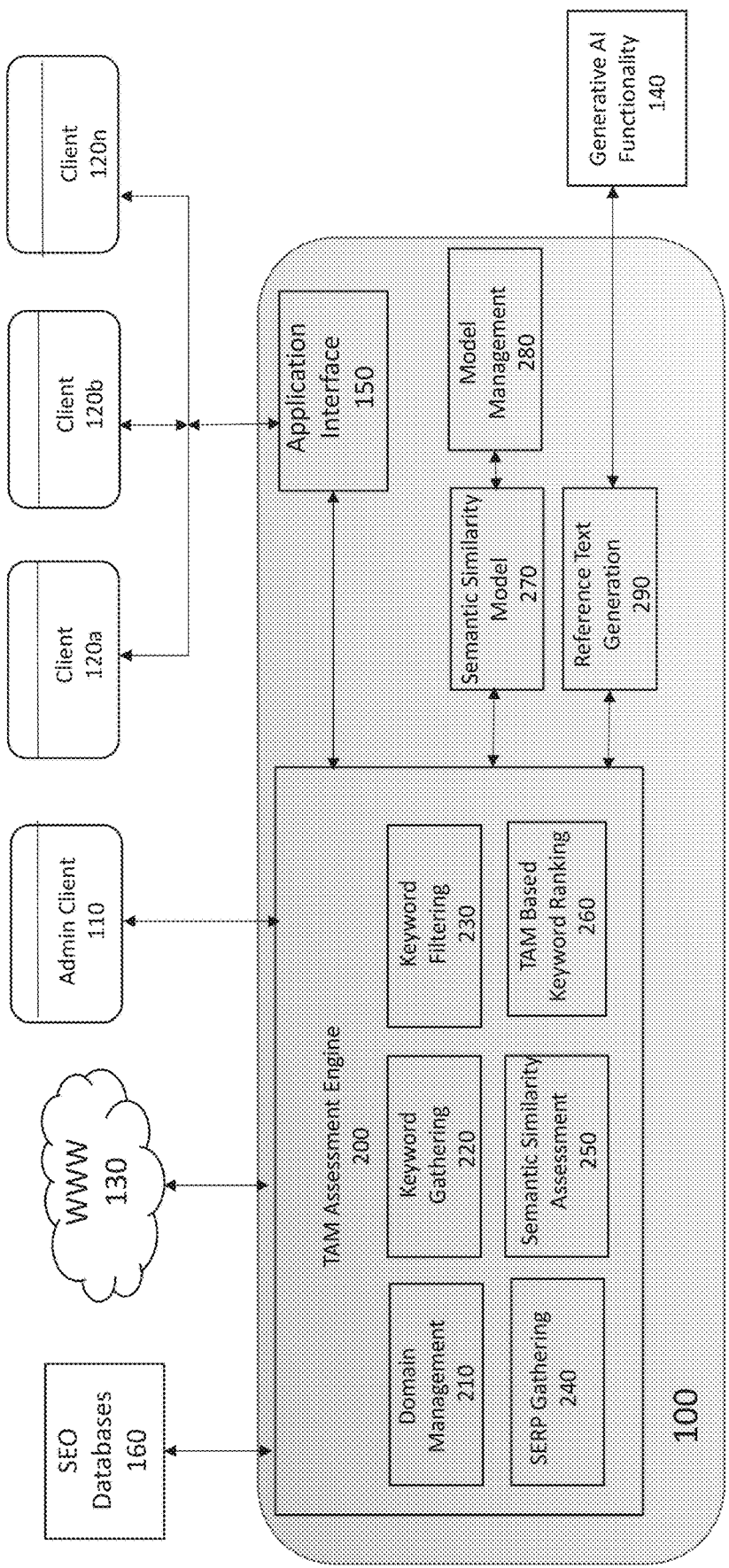
FIG. 1 illustrates elements of a Total Addressable Market Keyword Ranking System (TAM-KRS) enabling the generation of keyword-topic pairs and associated rankings thereof, according to embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to a system and methodology which assesses what may be a very large number of potential keywords associated with topics of interest and then assigns a semantic similarity score to each keyword-topic pair. The SSS generated by the system can then be used to select and/or implement the use of the most desirable keywords associated with topics of interest. Implementations may be used to construct a search engine optimization campaign which may include selection and use of highly scored keywords in connection with both organic search and paid search.

In some embodiments, a client website including some or all of the specific domains or routes associated therewith is selected for the initial harvesting of keywords. Other websites and/or domains, including competitor websites and domains, for example, can also be used to harvest keywords for potential ranking according to a calculated SSS. For whichever domains are selected, all potential keywords available on those domains are captured, provided that in preferred embodiments, only potential keywords meeting a minimum monthly search volume (MSV) or other minimum search volume metric are considered.

Once this initial universe of keywords is obtained, a filtering process is initiated by the system of the present invention to eliminate keywords that are not of interest for various reasons. More details with respect to the filtering process implemented in preferred embodiments is provided below. Given that the initial set of potential keywords associated with selected domains is likely to be extremely large-potentially in the range of hundreds of thousands to millions of keyword candidates-filtering of the initial data set is an important aspect and is desirable to minimize the cost associated with processing time and resource use in general.

Separate and apart from the generation of a filtered potential keyword dataset, the system and methodology also generates and uses a set of reference texts, each associated with a topic of interest. These topics generally reflect those that are interest to website owners/operators in that qualified/desirable traffic to the websites would preferably be interested in these topics. In this way, it is more likely that the traffic driven to the website and/or specific domains will be more likely to purchase, subscribe, interact with or otherwise take action which is desired by the website owner/operator. Generation of reference texts associated with topics of interest may be accomplished using generative AI functionality such as generative AI and related large language models (LLMs), manually produced or some combination of both.

Once the system of the present invention has generated the filtered keyword dataset and the set of reference texts, it then obtains the search engine results pages (SERPs) associated with each of the keywords in the filtered keyword dataset. Specific aspects of SERP generation including various processes and metrics associated therewith are further described below. Once the SERPs have been generated, textual information associated with each result in the SERP is extracted resulting in a SERP snippet dataset (SERPSDS) containing this textual information with respect to each set of search results that ties to each of the keywords in the filtered keyword dataset.

In preferred embodiments, the system of the present invention next compares the data contained in the SERPSDS with the generated reference texts for the topics of interest. This results in a set of semantic similarity scores (SSSs) associated with each keyword-topic pair. The SSS for each pair represents how close in meaning the keyword's content is to each of the topics of interest. These values can be used in various ways according to the teachings herein.

For example, a minimum threshold SSS can be selected and only keywords at or above this threshold can be selected for use in connection with the topic to which it is relevant. SSS can also be used to rank keywords by topic and/or place keywords in tiers as more fully set forth herein. The system of the present invention can also generate additional output data including the total search volume associated with various keywords including groupings of keywords which may be selected for use in connection with one or more topics of interest.

In some embodiments, the system of the present invention implements machine learning techniques to improve performance over time as additional data is provided to and generated by the system. For example, the model for generating SSS can receive feedback following the use of keywords selected according to the model. Based on, for example, receipt of SEO results including traffic driven and possibly conversion results as well as other metrics, the model can be adjusted in order to re-define how scores are generated to improve results. In addition, machine learning techniques can be applied to reference text generation functionality such that reference texts for topics continually improve with respect to content and/or breadth of topic used.

Referring now to FIG. 1, there is illustrated a TAM Assessment System (TAS) 100 according to one or more embodiments herein. TAS 100 may reside on a single cloud based server although it is also possible for various components of TAS 100 (as described herein) to reside on separate servers. By way of example, TAS 100 may be a computer implemented application which resides on a computing server. As will be apparent from the discussion herein, TAS 100 may include and/or implement all appropriate software (i.e., algorithms) and/or hardware (i.e., storage, processors) for carrying out its applicable keyword assessment and related capabilities.

TAS 100 preferably includes TAM Assessment Engine 200, which itself is comprised of a number of modules as discussed further herein. TAM Assessment Engine 200 operates to generate semantic similarity scores associated with keyword-topic pairs as more fully described herein. These scores are generated in response to requests originating from clients 120a, 120b . . . 120n. TAS 100 may be accessed through the internet or any other private or public network by one or more clients 120.

Each of clients 120 may be personal computers, laptops, handheld computing devices such as smartphones or tablets or any other device capable of providing the required connectivity and display. In some embodiments, a client 120 may be a computing application operated by a customer subscribed to TAS 100 which desires SSS in connection with selected websites and/or domains associated therewith. For example, client 120 may be an application or set of applications operated by an SEO consulting firm working on behalf of its clients that owns and/or operates various website properties on the worldwide web. Alternatively, clients 120 may be used by the website owner/operator directly or clients 120 may be used by any other party interested in obtaining SSS with respect to one or more websites and/or related domains.

Clients 120 interact with TAS 100 such that data may be communicated between them via application interface 150 and such that TAS 100 may process requests for SSS and related results made by clients 195 with regard to one or more of the above types of applications made by individuals or entities such as organizations. Results may be displayed on one or more user interfaces which preferably organizes the output results in a way such that the results can be easily understood and applied by a user. Application interface 150 may comprise one or more application programming interfaces (APIs) that permit applications associated with clients 120 to communicate with TAS 100.

Also shown in FIG. 1 is admin client 110. Admin client 110 may comprise a personal computer, laptop, handheld computing devices such as smartphones or tablets or any other similar device. Admin client 110 is operative to allow users to configure, maintain and support the operation of TAS 100. For example, a user may use admin client 110 to interact with TAS 100 to set parameters regarding what is required to invoke the generation of SSS and/or other related results with respect to topics and keywords as discussed in further detail below.

SEO databases 160 may also be present according to the teachings of one or more embodiments herein. SEO databases 160 may comprise one or more external databases, data sets, systems, applications, rules bases and/or other sources of data which are used by TAS 100 to develop reference text and/or SERPSDS. By way of example, SEO databases 160 may comprise previously obtained SERP which may be reused in creating SERPSDS data. SEO databases may also contain data that has been previously obtained from SERPs and reflecting data that can be directly used as SERPSDS (e.g. pre-configured sets of SERP snippet data extracted from search engine results page). SEO databases 160 may also include other data which may be useful to TAS 100 including, for example, public and/or private databases which are helpful to TAS in constructing either data for SERPSDS or reference text data, or both.

Returning now to the specific components of TAS 100, TAS 100 may include various components for generating SSS and for interacting with users via clients 120 in order to accept requests for SSS data and related results as well as providing the same to users via clients 120. In addition, TAS 100 may communicate with the world wide web 130 via known protocols for various purposes including to ingest SERPs using one or more selected search engines and/or for accessing generative AI functionality to generate reference text data as more fully described herein. Generative AI functionality 140 may also be included in some embodiments as either integral to TAS 100 or as an external resource as shown in FIG. 1. As discussed above and below, generative AI functionality may be used to generate reference text data as more fully described herein.

TAS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to TAS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 120, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of TAS 100 shown in FIG. 1, TAM Assessment Engine (hereinafter "TAMAE 200") includes various components which are described hereinbelow. Operation(s) of each of these TAMAE components will be described in further detail below with reference to FIG. 2.

In one or more embodiments, TAMAE 200 may include the following modules: domain management module 210, keyword gathering module 220, keyword filtering module 230, SERP gathering module 240, semantic similarity assessment module 250 and TAM based keyword ranking module 260. One or more of these components can, via operation of TAS 100, be cooperable with various other components of TAS 100 as well as external resources as more fully described herein.

Domain management module 210 is a component of TAMAE 200 in some embodiments. This module operates to locate and select potential websites and related domains from which keywords will be initially extracted. As noted above, domain management module 210 may select websites and domains as determined by users via clients 120 and/or it may suggest related domains and websites that should be used as a basis from which to extract the initial set of potential keywords. Operation of domain management module 210 may be configured to operate as desired through the use of input through admin client 110.

Keyword gathering module 220 is a component of TAMAE 200 in some embodiments. This module operates to extract the universe of potential keywords from the websites and domains selected by domain management module 210. Operation of keyword gathering module 220 may be configured to operate as desired through the use of input through admin client 110.

Keyword filtering module 230 is a component of TAMAE 200 in some embodiments. This module operates to filter out extraneous and/or non-desirable keywords from the initial universe of keywords extracted from selected websites and domains. As noted above, keyword filtering, as implemented by keyword filtering module 230 reduces processing cost and resource use with respect to the very large initial set of keywords likely to be obtained. By reducing the number of keywords and eliminating those that are not of interest based upon selected filtering criteria, system performance and overall results can be improved. Operation of keyword filtering module 230 may be configured to operate as desired, including the specification of desired filtering criteria, through the use of input through admin client 110.

SERP gathering module 240 is a component of TAMAE 200 in some embodiments. This module operates to obtain search engine results pages associated with the filtered keyword list generated as a result of the operation of domain management module 210, keyword gathering module 220 and keyword filtering module 230. SERP gathering module 240 may request and then obtain SERPs for all filtered keywords as generated by one or more selected search engines. Search engines to be used for obtaining SERPs may be determined by users via clients 120, by an admin user via admin client 110 and/or TAS 100 may suggest one or more search engines for use in generating SERPs. In the latter case, machine learning techniques may be applied so that previous iterations informs selection of the most effective search engines in generating SSS that is the most useful. In some embodiments, this module also operates to extract SERPSDS data from SERPs for use in connection with reference text data in order to generate SSS. Operation of SERP gathering module 240 may be configured to operate as desired through the use of input through admin client 110.

Semantic similarity assessment module 250 is a component of TAMAE 200 in some embodiments. This module operates to generate semantic similarity scores for keyword-topic pairs through the use of both SERPSDS data and reference text data. Reference text data is generated by reference text generation module 290, which may or may not be viewed as a component of TAMAE 200 (in FIG. 1, this module is shown as external to TAMAE 200). Reference text associated with topics of interest may be generated by reference text generation module 290 using internal and/or external generative AI functionality 140 and/or some or all of the reference text may be manually generated. In some embodiments, reference text may be a snippet of content associated with a topic while in others, it may be a list of keywords. Other forms of reference text is also possible while remaining within the scope and spirit of the present invention.

As noted above, semantic similarity assessment module 210 may use an existing semantic similarity model 270 to compare reference text against SERPSDS data to generate SSS. Semantic similarity model is managed under the control of model management component 280 which may include the use of machine learning techniques to update semantic similarity model from time to time as iterations of SSS is generated and feedback with respect to implementation thereof is obtained by TAS 100. Operation of semantic similarity assessment module 250 may be configured to operate as desired through the use of input through admin client 110.

TAM based keyword ranking module 260 is a component of TAMAE 200 in some embodiments. This module operates to perform data processing functions with respect to SSS generated by semantic similarity assessment module 250. For example, SSS may be used to generate keyword ranking displays and/or keyword tiering results as more fully described below and as may be requested by a user via client 120. Operation of TAM based keyword ranking module 260 may be configured to operate as desired through the use of input through admin client 110.

Figure 2:
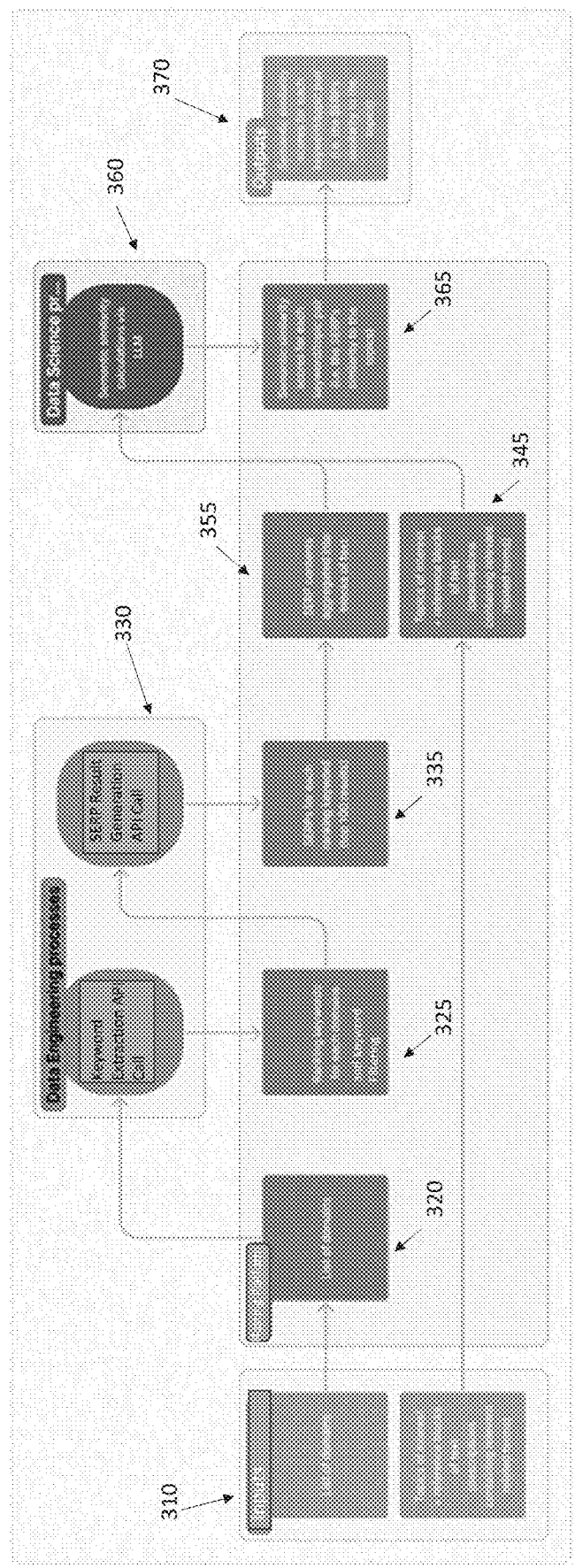
FIG. 2 illustrates a high-level flow diagram of a process of generating semantic similarity scores (SSS) for keyword-topic pairs, according to embodiments herein.

With reference now to FIG. 2, there is shown a process implemented by TAS 100 when one or more clients 120 request that semantic similarity scores be generated with respect to one or more domains. The process can begin at 310 with a client 120 (or a user operating client 120) providing two primary inputs-a list of domains from which a keyword universe is to be generated and a set of topics of interest to which semantic similarity is to be assessed. While these inputs may, in some cases, be required, this is not always the case. For example, as noted above, TAS 100 can operate to suggest domains and/or websites that may be of interest in connection with obtaining an initial keyword universe. TAS 100 may suggest and/or determine domains via domain management module 210.

Similarly, TAS 100 may operate to itself generate reference text based on the input of topic identities which may be as simple as individual topic words or possibly a sentence or two describing the topic. As noted above, TAS 100 via TASAE 200 may function to generate reference text via reference text generation module 290 and generative AI functionality 140.

According to some embodiments of the present invention, steps 320, 325, 335, 345, 355 and 365 are implemented on the same server which may provide the functionality of TAMAE 200. According to some embodiments of the present invention, data engineering processes 330 and data science processes 360 may be implemented on separate servers and initiated via API calls or otherwise at the appropriate time. As will be apparent to one of skill in the art, this is not required as some or all of the functionality shown in FIG. 2 as being implemented on the hosting platform may be implemented elsewhere and, similarly, some or all of the data engineering processes 330 and data science processes 360 might be implemented on the same hosting platform as some or all of steps 320, 325, 335, 345, 355 and 365.

At step 320, a list of domains to be used to generate the initial keyword universe is generated. As noted above, this list may be provided by a user at client 120 or by client 120 or the list may be fully or partially generated by TAS 100. In some embodiments, the list of domains is provided to data engineering process 330 which extracts all available keywords from the selected domains. For example, this may be accomplished via an API call to an available service, scraping results or pulling results directly from a search engine, all of which will return all ranking keywords for each of the domains. As discussed above, ranking metrics may be selected, for example via admin client 110. For example, TAS 100 may be configured to return keywords from domains which have a minimum MSV of 100. As discussed above, different thresholds or criteria may be selected.

The list of keywords meeting the criteria is returned by data engineering process 330 and made available at step 325. In some embodiments, these keywords are filtered at step 325 to remove extraneous and/or undesirable keywords to reduce processing time and the use of resources. This initial filtering is implemented by keyword filtering module 230. Various options for initial keyword filtering is possible. In some cases, a user at client 120 may select keywords to be filtered out. Alternatively, or in addition, the system of the present invention may separately keep a list of keywords to be filtered out in various circumstances such as undesirable terms such as other brand names.

In some embodiments, once the filtered keyword list is generated at step 325 another API call may be made to data engineering processes 330. In this case, for example, a call may be made to an external service which obtains SERP results for a given keyword and, in some cases, formats such results. This process returns, at step 335, search engine results pages for all keywords in the filtered keyword list. As noted above, and as will be apparent to one of skill in the art, various metrics can be used to determine which SERPs are returned (e.g. top 100 results as shown in FIG. 2 or other options such as first 3 or some other number of pages of search results etc.)—many other options exist. SERPs may be returned with respect to one search engine or to multiple search engines according to the set system configuration.

In some embodiments, at step 355, the SERP content for each SERP result is extracted into blocks of text. This may be accomplished in various ways. In some embodiments, all links, titles and snippets for ranking pages appearing on the SERP are concatenated into text blocks. This can be accomplished, for example, using SQLs concat function. An exemplary set of blocks of text associated with results on a search results page may be created as follows:

hhttps://www.congress.gov/bill/118th-congress/house-bill/450/text H.R.450-118th Congress (2023-2024): Repeal the NFA Act To amend the Internal Revenue Code of 1986 to repeal the National Firearms Act. IN THE HOUSE OF REPRESENTATIVES.

https://www.congress.gov/bill/118$^{th}$congress/house-bill/450!=18r=97 H.R.450-118$^{th}$ Congress (2023-2024): Repeal the NFA Act Introduced in House (01/24/2023). Repeal the NFA Act. This bill repeals the National Firearms Act. Congress.gov Site Content Legislation. Committee Reports.

http://burlison.house.gov/media/press-releases/rep-eric-burlison-introduces-repeal-nfa-act Rep. Eric Burlison Introduces "Repeal the NFA Act"-House.gov Today, Representative Eric Burlison (R-MO) introduced his first bill as a Member of Congress, the "Repeal the NFA Act."

https://www.news-leader.com/story/news/politics/2023/01/27/eric-burlisons-first-bill-in: congress-aims-to-repeal:1930s-gun-law/69843641007/Eric Burlison's first bill in Congress aims to repeal 1930s. . . . The southwest Missouri Republican's "Repeal the NFA Act" would remove requirements under federal law to pay a $200 tax. register and undergo . . .

https://www.kansascity.com/news/politics-government/article271638537.html Missouri congressman wants to repeal National Firearms Act . . . repeal a 1934 law that taxes the manufacturing and sale of certain guns and requires owners to register those guns. "The Repeal the NFA Act . . .

Separate from the above described process flow steps, step 345 may run in parallel or serially after any of the above described steps. At this step, the topics input from step 310 is processed to create reference text blocks for each of the topics. An exemplary reference text may be created as follows:

Mortgage Reference Text Writeup

Mortgages are a fundamental financial tool in the real estate market, allowing individuals and businesses to purchase property without paying the full amount upfront. At its core, a mortgage is a loan specifically designed for the purchase of real estate, secured by the property itself. This means that if the borrower fails to make the agreed-upon payments, the lender has the right to take possession of the property through a process known as foreclosure.

There are two primary parties involved in a mortgage: the borrower (also known as the mortgagor) and the lender (also known as the mortgagee). The borrower is the individual or entity taking out the loan to purchase property, while the lender is the financial institution or mortgage company providing the loan.

Mortgages come in various types, catering to different needs and financial situations. The most common types include fixed-rate mortgages, where the interest rate remains the same throughout the life of the loan, and adjustable-rate mortgages (ARMs), where the interest rate can change at specified times based on prevailing market conditions. Other types include interest-only mortgages, where the borrower pays only the interest on the loan for a set period, and reverse mortgages, designed for older homeowners to convert part of their home equity into cash.

The process of obtaining a mortgage involves several steps, starting with the application and moving through pre-approval, the home search, the mortgage application, underwriting, and finally, closing. Factors such as the borrower's credit score, income, debt-to-income ratio, and the down payment amount significantly affect the loan's terms and interest rate.

Mortgage rates are influenced by various factors, including economic indicators, central bank policies, inflation, and the overall health of the housing market. These rates determine the cost of borrowing and significantly impact the affordability of purchasing property.

Having a mortgage comes with financial responsibilities and implications, including the commitment to make regular payments over a long period, typically 15 to 30 years. It's essential for borrowers to consider their long-term financial stability and the implications of interest rates and market changes on their ability to maintain payments.

In summary, mortgages play a crucial role in enabling homeownership, offering various options to suit different financial situations and preferences. Understanding the nuances of mortgages, from the types available to the factors influencing rates and the responsibilities of borrowers, is essential for anyone looking to navigate the real estate market successfully.

Another example of a reference text block may consist of essentially a list of keywords such as the following:

Cat health reference text keywords
how long do cats live
how long are cats pregnant
how often do you take a cat to the vet
feline leukemia
can cats get colds
cat sneezing a lot
hypothyroidism in cats
when do cats stop growing
worms in cats
cat eye infection
how long are cats in heat
how to get rid of fleas on cats
mange in cats
cat throwing up
cat constipation
how much should I feed my cat
can you put Neosporin on a cat
cat throws up after eating
can cats get lice
how to tell if a cat has a fever
why is my cat shedding so much
what to give a constipated cat
what do cat fleas look like
how to tell if a cat is dehydrated
why is my cat's nose dry In some embodiments, at step 365, the results from step 355 (blocks of text from SERP results) and the results from step 345 (reference text blocks) are provided as input to a large language model (LLM) 360 which is implemented to derive semantic similarity scores as referenced above. While the model and related processing 360 are shown as being implemented on a platform separate from the processing occurring at previous steps, this is not necessary and the present invention may be alternatively implemented with the model (which is also referenced as semantic similarity model 270 in FIG. 1) residing on the same server as other processes.

In some embodiments, semantic similarity scores are generated for each keyword-topic pair as follows:

1. A large language model is used to calculate word embeddings for each SERP's contents as well as each of the reference texts. In some implementations, paraphrase-MiniLM-L6-v2 may be used (see e.g. sentence-transformers/paraphrase-MiniLM-L6-v2. Hugging Face). An alternative model that may also be used is e5-base-v2 (see e.g. intfloat/eS-base-v2. Hugging Face). It is also possible to use alternative LLMs while remaining within the scope and spirit of the present invention.

2. Cosine similarity is calculated from the embeddings for each of the combinations of reference texts and SERPs. This is available as a function for use with the vector data type in various platforms (see e.g. Snowflake). It is also available at and it can also be located at: sklearn.metrics.pairwise.cosine similarity—scikit-learn 1.4.2 documentation or this function can be manually defined in programming languages.

3. The resulting cosine similarity value generated is employed as the semantic similarity score for each keyword-topic pair.

Once the keyword-topic pairs have been generated, they may be organized, for example, as a table such as shown in the following example.

The filtering process for keywords using SSS results can be further refined, in some embodiments as follows. For example:

Keywords can be sorted into tiers (or buckets) according to two variables:

Variable 1—The presence of an identified client or competitor domain or path on the keyword's SERP Variable 2—The keyword's SERP having a high enough semantic similarity score to one or more of the identified topics' reference texts.

As an example:

Tier 1: Any keyword where results from https://www.aig.com, https://www.metlife.com/, or https://www.guardianlife.com/are on the SERP and at least one topic has a semantic similarity score of >=0.4

Tier 2: Any keyword where results from https://www.aig.com, https://www.metlife.com/, https://www.guardianlife.com/, https://www.progressive.com/insurance/health/, https://www.progressive.com/travel-insurance/, https://www.progressivecommercial.com/business-insurance/, or https://www.allianztravelinsurance.com/travel/and at least one topic has a semantic similarity score of >=0.4

| KEYWORD | SEARCH VOLUME | BREED INFO | CAN PETS EAT | CAT HEALTH | DOG HEALTH |
|---|---|---|---|---|---|
| cats | 823000 | 0.2758723 | 0.1503678 | 0.4307852 | 0.0992836 |
| dog breeds | 368000 | 0.3344143 | 0.2277554 | 0.0883082 | 0.3748786 |
| girl names | 368000 | 0.1445975 | 0.0236203 | 0.0471630 | −0.0053695 |
| geico phone number | 301000 | −0.0533538 | 0.0070875 | −0.0122655 | 0.0514859 |
| prudential login | 74000 | −0.0756026 | −0.0317083 | −0.0071496 | −0.0569494 |
| can dogs eat grapes | 60500 | 0.3135942 | 0.3682606 | 0.2263447 | 0.4292646 |
| cat years to human years | 60500 | 0.2349041 | 0.0030904 | 0.3625291 | 0.0266253 |

The table above represents one example of an output format that may be provided to a user at client 120 at step 370 in FIG. 2. Other output formats illustrating semantic similarity scores for keyword-topic pairs are also possible. In this example, a set of keywords (cats, dog breeds, girl names, geico phone number, prudential login, can dogs eat grapes, cat years to human years) are matched up with a set of topics (breed info, can pets eat, cat health, dog health) to form a set of keyword-topic pairs represented by the cells in the table. The table also includes MSV values for each of the keywords.

The numbers in the cells represent the SSS value determined for each keyword-topic pair. In this example, all scores meeting a minimum threshold of 0.3 are shaded. Of course this value is merely exemplary. In this example, it can be seen that three of the keywords (girl names, geico phone number, prudential login) which are shaded failed to obtain SSS of 0.3 for any of the topics of interest. As such, these keywords can be filtered out (see filtering step discussed above) for future iterations of SSS generation when these same topics are noted of interest. In other words, these keyword-topic pairs will typically be eliminated even before the SSS model is applied to keyword-topic pairs in the future. In this manner, processing for keyword-topic pair SSS can become more efficient and obtain better results in later iterations for known topics.

Tier 3: Any keyword where results from https://www.aig.com, https://www.metlife.com/, https://www.guardianlife.com/, https://www.progressive.com/insurance/health/, https://www.progressive.com/travel-insurance/, https://www.progressivecommercial.com/business-insurance/, or https://www.allianztravelinsurance.com/travel/and at least one topic has a semantic similarity score of >=0.2

Tier 4: All other results

These keyword tiers/buckets can then be used for future keyword filtering prior to future generation of SSS or they can be used to guide a user in terms of which keywords to select for campaigns associated with topics, or both.

The system of the present invention can also generate and provide to users via clients 120 MSV values associated with individual keywords as well as collective MSV for all keywords of interest for desired topics such as the four remaining keywords in the table above. In this example, total MSV for keywords that may be selected for use in connection with the four selected topics (cats—823,000 plus dog breeds—368,000 plus can dogs eat grapes—60,500 plus cat years to human years—60,500) equals 1,312,000 total MSV representing a potential total addressable market (TAM) for the topics of interest.

Another possible use of SSS scores in some embodiments is to use the highest SSS to assign group membership to ranking keywords. For the above example:
- cats would belong to Cat Health topic;
- dog breeds would belong to Dog Health topic;
- can dogs eat grapes would belong to Dog Health topic; and
- cat years to human years would belong to the Cat Health topic.

In this example, some results have their highest SSS tied to more general topics. This may indicate an issue with topic definition. Dog breeds should ideally belong to Breed Info and can dogs eat grapes should ideally belong to Can Pets Eat. The fact that these keywords are more closely associated with Dog Health suggests that the reference text for the Dog Health topic may be too broad. As such, the system of the present invention can take this into account in generating reference text for these same topics in future iterations.

Figure 3:
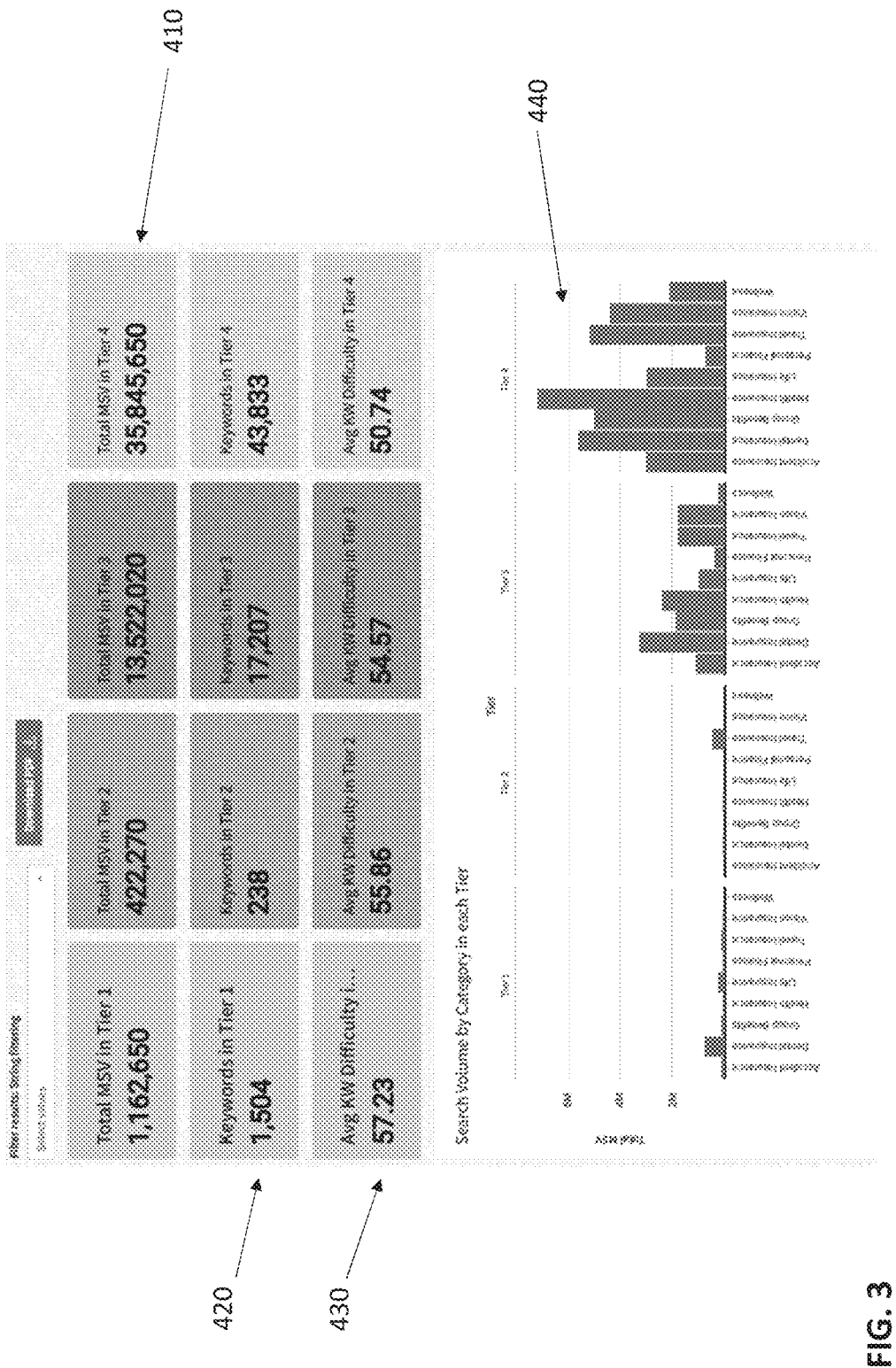
FIG. 3 is an exemplary user interface output illustrating the generation of data enabling keyword selection and ranking for associated topics, according to embodiments herein.

With reference now to FIG. 3, an exemplary display is provided which illustrates a possible user interface display available to a user at client 120 and including results from the processes of the present invention based upon a user request. The display is merely exemplary and many other formats, data layouts and content options are available while remaining within the scope and spirit of the present invention. In this example, the row of data blocks in row 410 provides total MSV for selected keywords associated with desired topics. In some embodiments total MSV may be broken down by tier as shown in FIG. 3.

Row 420 provides the number of keywords suggested for use with desired topics broken down by tier. Row 430 provides average keyword difficulty for selected keywords, again broken down by tier. Chart 440 may also be included in the display. In this case, chart 440 illustrates the total MSV for each of the selected keywords, broken down by tier.

Figure 4:
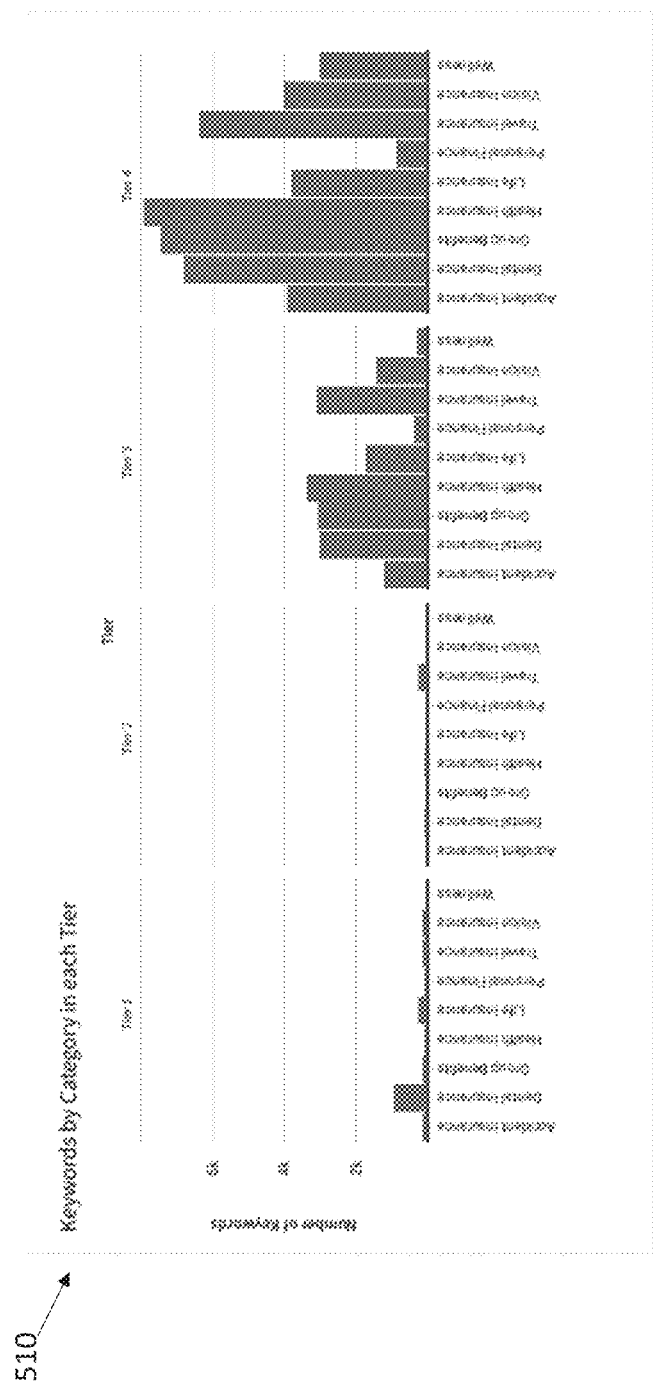
FIG. 4 is an exemplary user interface output illustrating keyword availability for topic by tier, according to embodiments herein.

Another example of a possible user interface display for users of the system of the present invention is provided in FIG. 4. In this case, a chart 510 illustrates the number of keywords included in the TAM with respect to each selected topic broken down by tier. It will be readily apparent to one of skill in the art that the displays discussed herein are merely exemplary and various other formats and data content selections can be made while remaining within the scope and spirit of the present invention.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A computer-implemented method of assessing keyword-topic pairs, the method comprising:
   selecting domains of websites via a computer comprising a domain management module;
   extracting, by said computer, keywords associated with said selected domains;
   generating, by said computer and upon evaluating an entirety of content available on the world wide web (WWW), a set of search engine results pages (SERPs) associated with said extracted keywords,
   wherein each respective SERP dataset associated with a respective one or more of said extracted keywords comprises a SERP text block (a) being inspected for said entirety of said WWW content and (b) qualifying a respective SERP for said associated respective SERP dataset, in response to a context of said SERP text block satisfying said associated SERP dataset of said respective one or more extracted keywords based on said context of said SERP text block and a context of said respective one or more extracted keywords;
   filtering said extracted keywords prior to the generating the set of SERPs based on said extracted keywords, wherein said filtering comprises selecting only keywords of said extracted keywords that meet a minimum search volume criteria;
   generating a plurality of reference text blocks for a plurality of topics;
   in response to a request from a client, applying a semantic scoring model to said reference text blocks and said SERPs to generate a semantic similarity score for each keyword-topic pair of a plurality of keyword-topic pairs; and
   obtaining, by said computer, search results based on said semantic similarity scores for said plurality of keyword-topic pairs.

2. The method of claim 1 wherein said filtering step employs at least one semantic similarity score in order to filter said extracted plurality of keywords.

3. The method of claim 1 wherein said semantic similarity scores are used to rank keywords with respect to said plurality of topics.

4. The method of claim 3 wherein group membership is assigned to ranking keywords based on such keywords having a minimum semantic similarity score.

5. The method of claim 1 wherein said reference text blocks are generated using a generative AI model.

6. The method of claim 5 wherein said generative AI model uses said semantic similarity scores as an input in generating said reference text blocks.

7. A computing system for assessing keyword-topic pairs, the computing system comprising: one or more processors; and one or more memories storing instructions that, when executed by the one or more processors, cause the computing system to perform a process comprising:
- selecting domains of websites via a computer comprising a domain management module;
- extracting keywords associated with said selected domains;
- generating, upon evaluating an entirety of content available on the world wide web (WWW), a set of search engine results pages (SERPs) associated with said extracted keywords,
- wherein each respective SERP dataset associated with a respective one or more of said extracted keywords comprises a SERP text block (a) being inspected for said entirety of said WWW content and (b) qualifying a respective SERP for said associated respective SERP dataset in response to a context of said SERP text block satisfying said associated SERP dataset of said respective one or more extracted keywords based on said context of said SERP text block and a context of said respective one or more extracted keywords;
- filtering said extracted keywords prior to the generating the set of SERPs based on said extracted keywords, wherein said filtering comprises selecting only keywords of said extracted keywords that meet a minimum search volume criteria;
- generating a plurality of reference text blocks for a plurality of topics;
- in response to a request from a client, applying a semantic scoring model to said reference text blocks and said SERPs to generate a semantic similarity score for each keyword-topic pair of a plurality of keyword-topic pairs; and
- obtaining search results based on said semantic similarity scores for said plurality of keyword-topic pairs.

8. The computing system of claim 7 wherein said filtering employs at least one semantic similarity score in order to filter said extracted plurality of keywords.

9. The computing system of claim 7 wherein said semantic similarity scores are used to rank keywords with respect to said plurality of topics.

10. The computing system of claim 9 wherein group membership is assigned to ranking keywords based on keywords having a minimum semantic similarity score.

11. The computing system of claim 7 wherein said reference text blocks are generated using a generative AI model.

12. The computing system of claim 11 wherein said generative AI model uses said semantic similarity scores as an input in generating said reference text blocks.

* * * * *